(12) United States Patent
Yuyama

(10) Patent No.: US 11,527,136 B2
(45) Date of Patent: Dec. 13, 2022

(54) COMMODITY PROVIDING APPARATUS AND METHOD THEREFOR

(71) Applicant: TOSHIBA TEC KABUSHIKI KAISHA, Tokyo (JP)

(72) Inventor: Satoshi Yuyama, Suginami Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/338,035

(22) Filed: Jun. 3, 2021

(65) Prior Publication Data
US 2022/0092950 A1 Mar. 24, 2022

(30) Foreign Application Priority Data

Sep. 18, 2020 (JP) .............................. JP2020-157271

(51) Int. Cl.
*G08B 5/36* (2006.01)
*G08B 25/00* (2006.01)
*G06Q 10/08* (2012.01)

(52) U.S. Cl.
CPC ........... *G08B 5/36* (2013.01); *G06Q 10/0836* (2013.01); *G08B 25/008* (2013.01)

(58) Field of Classification Search
CPC .... G08B 5/36; G08B 25/008; G06Q 10/0836; G06F 3/0482; G06F 3/04842
See application file for complete search history.

(56) References Cited

U.S. PATENT DOCUMENTS

| 5,605,393 A * | 2/1997 | Cucchi ..................... A61D 3/00 108/23 |
| 5,974,393 A * | 10/1999 | McCullough .... G06Q 10/06311 705/16 |
| 10,846,980 B2 * | 11/2020 | French .................. G07F 17/322 |
| 2009/0179734 A1 * | 7/2009 | Do ....................... G06F 16/9554 340/5.8 |
| 2013/0234858 A1 * | 9/2013 | Chen .................... G01G 15/001 340/666 |
| 2016/0350818 A1 * | 12/2016 | Saeed ................ G06Q 30/0282 |
| 2021/0158672 A1 * | 5/2021 | Goldman ........... G06Q 30/0635 |

FOREIGN PATENT DOCUMENTS

| JP | 2007-172383 A | 7/2007 |
| JP | 2014-206953 A | 10/2014 |

\* cited by examiner

*Primary Examiner* — John A Tweel, Jr.
(74) *Attorney, Agent, or Firm* — Foley & Lardner LLP

(57) ABSTRACT

A commodity providing apparatus includes a placement unit, a provision guidance unit, and a pick-up guidance unit. A plurality of commodities can be placed on the placement unit. The provision guidance unit guides a provider of a commodity to a placement location in the placement unit of the commodity that can be provided. The pick-up guidance unit guides an orderer of the commodity placed on the placement unit to the placement location of the commodity.

16 Claims, 10 Drawing Sheets

FIG. 5
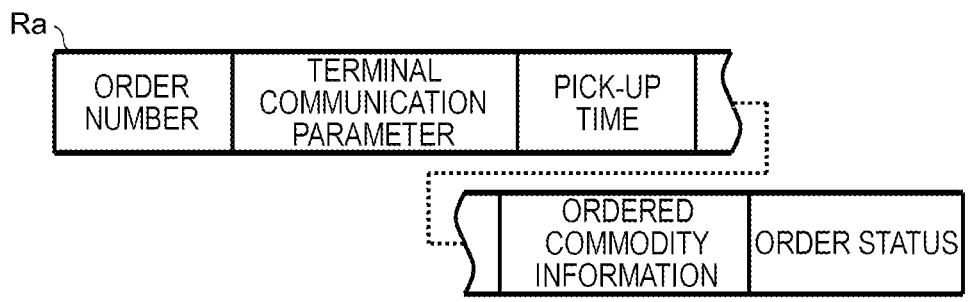
FIG. 6
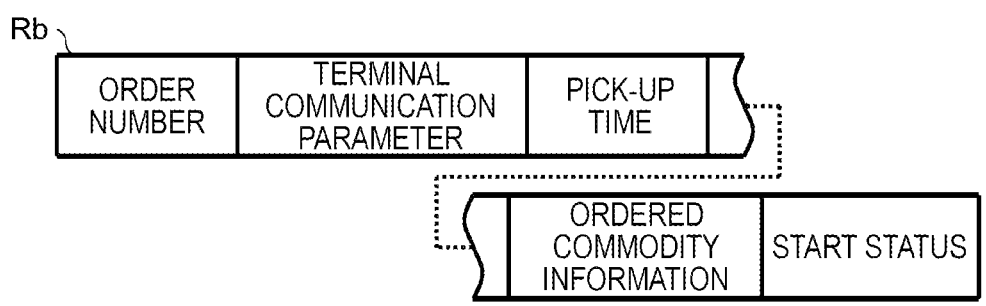
FIG. 7
| LOCATION ID | EMPTY FLAG | ORDER NUMBER |
|---|---|---|
| A | 0/1 | |
| B | 0/1 | |
| C | 0/1 | |
| D | 0/1 | |
| E | 0/1 | |
| F | 0/1 | |
| G | 0/1 | |
| H | 0/1 | |

FIG. 13

| | | | | 12:28 | SCa |
|---|---|---|---|---|---|
| PLEASE START FOLLOWING ORDER | | | | | |
| ORDER NUMBER | PICK-UP TIME | COMMODITY NAME | | | |
| 101 | 12:30 | COMMODITY I | PROVISION | | BTa |
| 102 | 12:30 | COMMODITY J, COMMODITY K | PROVISION | | BTa |
| 103 | 12:30 | COMMODITY L(2) | PROVISION | | BTa |
| 104 | 12:30 | COMMODITY M | PROVISION | | BTa |

FIG. 14

| | | | | 12:30 | SCb |
|---|---|---|---|---|---|
| COMMODITY WITH FOLLOWING ORDER NUMBER IS READY | | | | | |
| ORDER NUMBER | PICK-UP TIME | COMMODITY NAME | | | |
| 101 | 12:30 | COMMODITY I | PICK-UP | | BTb |
| 102 | 12:30 | COMMODITY J, COMMODITY K | PICK-UP | | BTb |
| 103 | 12:30 | COMMODITY L(2) | PICK-UP | | BTb |
| 104 | 12:30 | COMMODITY M | PICK-UP | | BTb |

COMMODITY PROVIDING APPARATUS AND METHOD THEREFOR

CROSS-REFERENCE TO RELATED APPLICATION

This application is based upon and claims the benefit of priority from Japanese Patent Application No. 2020-157271, filed on Sep. 18, 2020, the entire contents of which are incorporated herein by reference.

FIELD

Embodiments described herein relate generally to a commodity providing apparatus and a method of using the same.

BACKGROUND

In recent years, the number of restaurants or take-out specialty stores that receive an order and a settlement for a commodity online using the Internet or the like and that provide the commodity at the store is increasing. Since this type of sales method can alleviate congestion at the store and there is almost no contact between a salesclerk, who is a provider of the commodity, and a customer, who is an orderer, this type of sales method is also effective as a preventive measure against infectious diseases.

On the other hand, this type of sales method allows the customer to pick up the commodity. Therefore, if a customer who orders a similar commodity comes to receive the commodity at almost the same time, there is a concern that the customer may mistakenly pick up the commodity.

DESCRIPTION OF THE DRAWINGS

FIG. 5 is a schematic diagram illustrating a main data structure of an order record stored in an order file;

FIG. 6 is a schematic diagram illustrating a main data structure of a start record stored in a start file;

FIG. 7 is a configuration diagram of a location table;

FIG. 13 is a diagram illustrating an example of displaying a provider image;

FIG. 14 is a diagram illustrating an example of displaying an orderer image;

DETAILED DESCRIPTION

One embodiment provides a commodity providing apparatus capable of preventing a commodity from being mistakenly picked up.

In general, according to one embodiment, a commodity providing apparatus includes a placement unit, a provision guidance means, and a pick-up guidance means. A plurality of commodities can be placed on the placement unit. The provision guidance means guides a provider of a commodity to a placement location in the placement unit of the commodity that can be provided. The pick-up guidance means guides an orderer of the commodity placed on the placement unit to the placement location of the commodity.

Hereinafter, one embodiment will be described with reference to the drawings.

The embodiment relates to a commodity providing apparatus for a restaurant or a take-out specialty store having a sales method in which an order and a settlement for a commodity are received online and the commodity is provided at the store. Hereinafter, the restaurant or the take-out specialty store is simply referred to as a store. A salesclerk is referred to as a provider and a customer is referred to as an orderer.

Figure 1:
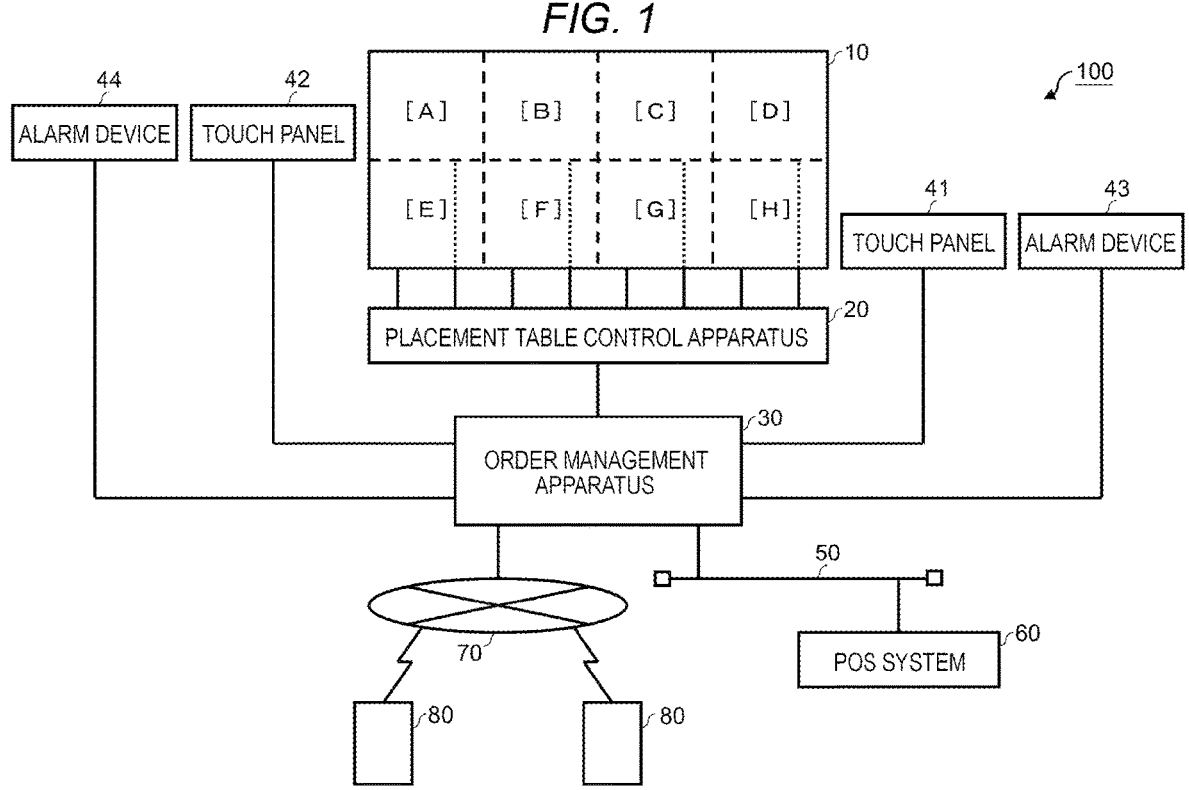
FIG. 1 is a schematic diagram of a system including a commodity providing apparatus according to at least one embodiment.

FIG. 1 is a schematic diagram of a system including a commodity providing apparatus according to the embodiment. The commodity providing apparatus includes a placement table 10, a placement table control apparatus 20 (placement table controller), and an order management apparatus 30 (order manager).

The placement table 10 is a placement unit for placing a commodity. A top surface of the placement table 10 is divided into eight locations: a placement location [A] (surface, counter), a placement location [B] (surface, counter), a placement location [C] (surface, counter), a placement location [D] (surface, counter), a placement location [E] (surface, counter), a placement location [F] (surface, counter), a placement location [G] (surface, counter), and a placement location [H] (surface, counter) so that a plurality of commodities can be placed thereon. The above-described placement table 10 is typically arranged on a counter installed to separate the provider from the orderer. The provider, who is on one side in a state where the counter is interposed between the provider and the orderer, places a completed commodity on any one of the placement locations of the placement table 10. If the orderer, who is on the other side in a state where the counter is interposed therebetween, confirms that the ordered commodity is completed, the orderer picks up the ordered commodity from the placement table 10. Accordingly, the orderer can pick up the commodity provided by the provider. The placement table control apparatus 20 controls a device provided at the respective placement locations [A] to [H] of the placement table 10. The device will be described later.

The order management apparatus 30 is electrically connected to the placement table control apparatus 20, and various signals are inputted and outputted between the placement table control apparatus 20 and the order management apparatus 30.

The order management apparatus 30 connects two touch panels 41 and 42 (displays) and two alarm devices 43 and 44 (alarms), respectively. One touch panel 41 is used for the provider and the other touch panel 42 is used for the orderer. The provider provides the completed commodity to the orderer based upon information displayed on the touch panel 41. The orderer picks up the completed commodity based upon information displayed on the touch panel 42. One alarm device 43 is used for the provider and the other alarm device 44 is used for the orderer. Details thereof will be described later, and if the provider places the commodity on the wrong placement locations [A] to [H] of the placement table 10, the alarm device 43 issues (sounds, emits, produces) an alarm. In the same manner, if the orderer picks up the commodity from the wrong placement locations [A] to [H] of the placement table 10, the alarm device 44 issues an alarm.

The order management apparatus 30 is connected to a Local Area Network (LAN) 50 laid in the store. A Point Of Sales (POS) system 60 is connected to the LAN 50. A system device other than the POS system 60 may be connected to the LAN 50. The POS system 60 may take various forms.

The order management apparatus 30 is connected to an Internet 70 (network) which is a wide area public network. The orderer can perform an order for a commodity and a settlement therefor online using the Internet 70 by operating a general-purpose user terminal (mobile device) such as a smart phone, a tablet terminal, a personal computer, or the like.

Figure 2:
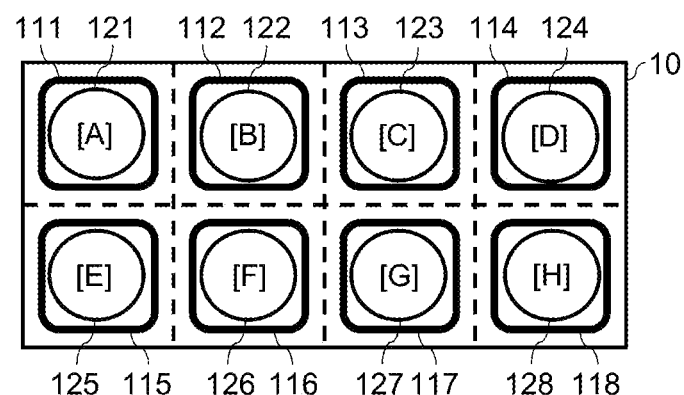
FIG. 2 is an explanatory diagram of a device arranged on a placement table.
Figure 3:
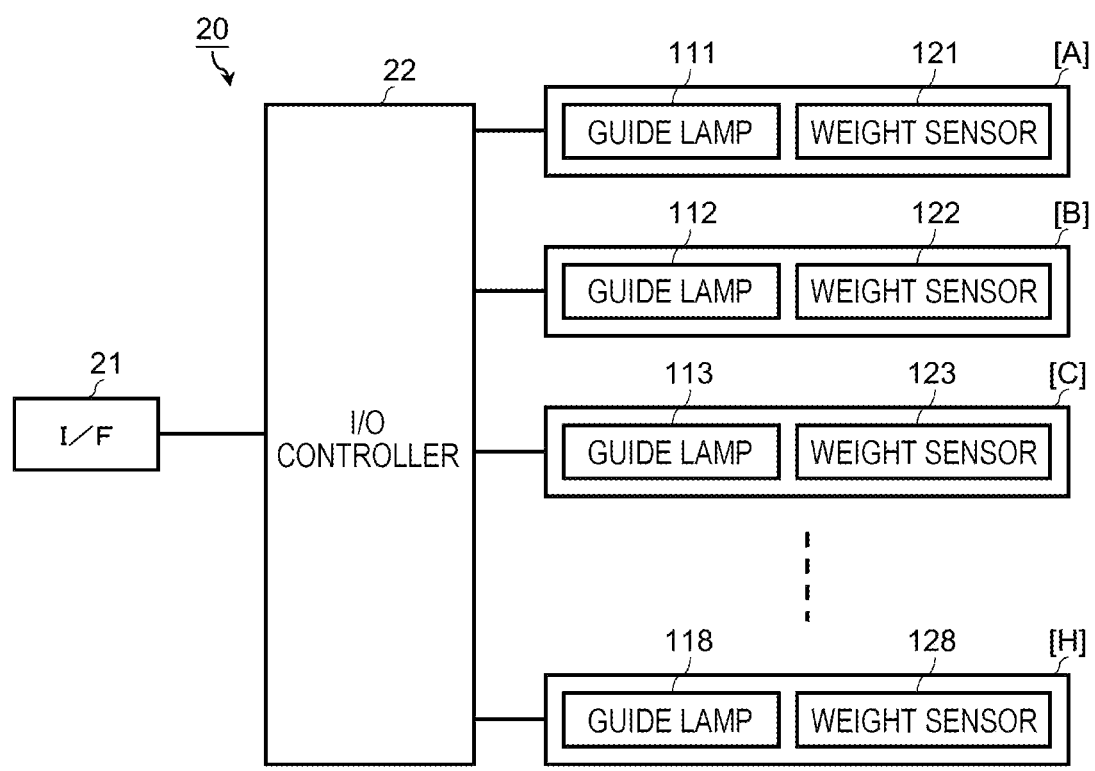
FIG. 3 is an explanatory diagram of a main part of a placement table control apparatus.

FIG. 2 is an explanatory diagram of a device arranged on the placement table 10, and FIG. 3 is an explanatory diagram of a main part of the placement table control apparatus 20. As illustrated in FIGS. 2 and 3, respective guide lamps 111 to 118 (lights, light emitting diodes (LEDs), indicators) and weight sensors 121 to 128 (sensors) are arranged at the respective placement locations [A] to [H] of the placement table 10.

The guide lamps 111 to 118 are devices for guiding the provider or the orderer to the placement locations [A] to [H] of the commodity by, for example, causing an LED to light up or blink. As this kind of guidance device, display elements such as a liquid crystal panel, an organic electroluminescent (EL) panel, or the like may be used. The provider or the orderer may be guided to the placement locations [A] to [H] by using voice, vibration, or the like.

The weight sensors 121 to 128 are devices for detecting, by a change in weight, that the commodity is placed on the corresponding placement locations [A] to [H] or the commodity is picked up therefrom. As this type of detection device, other sensors such as a position sensor, a dimension sensor, or the like may be used. Alternatively, two or more sensors may be combined to form the detection device.

The placement table control apparatus 20 includes an interface (I/F) 21 and an input/output (I/O) controller 22. Various signals are transmitted and received between the interface 21 and the order management apparatus 30.

The I/O controller 22 selectively outputs a drive signal to the guide lamps 111 to 118 of the respective placement locations [A] to [H] according to a control signal from the order management apparatus 30. The control signal includes information for specifying any one of the placement locations [A] to [H]. The I/O controller 22 outputs the drive signal to the guide lamps 111 to 118 of the placement locations [A] to [H] specified by the information.

The I/O controller 22 inputs measurement signals of the weight sensors 121 to 128 arranged at the respective placement locations [A] to [H]. Next, when detecting the change in weight measured by any one of the weight sensors 121 to 128 from a change in the measurement signals, the I/O controller 22 outputs an information signal indicating the placement locations [A] to [H] at which the weight sensors 121 to 128 are arranged to the order management apparatus 30 via the interface 21.

Figure 4:
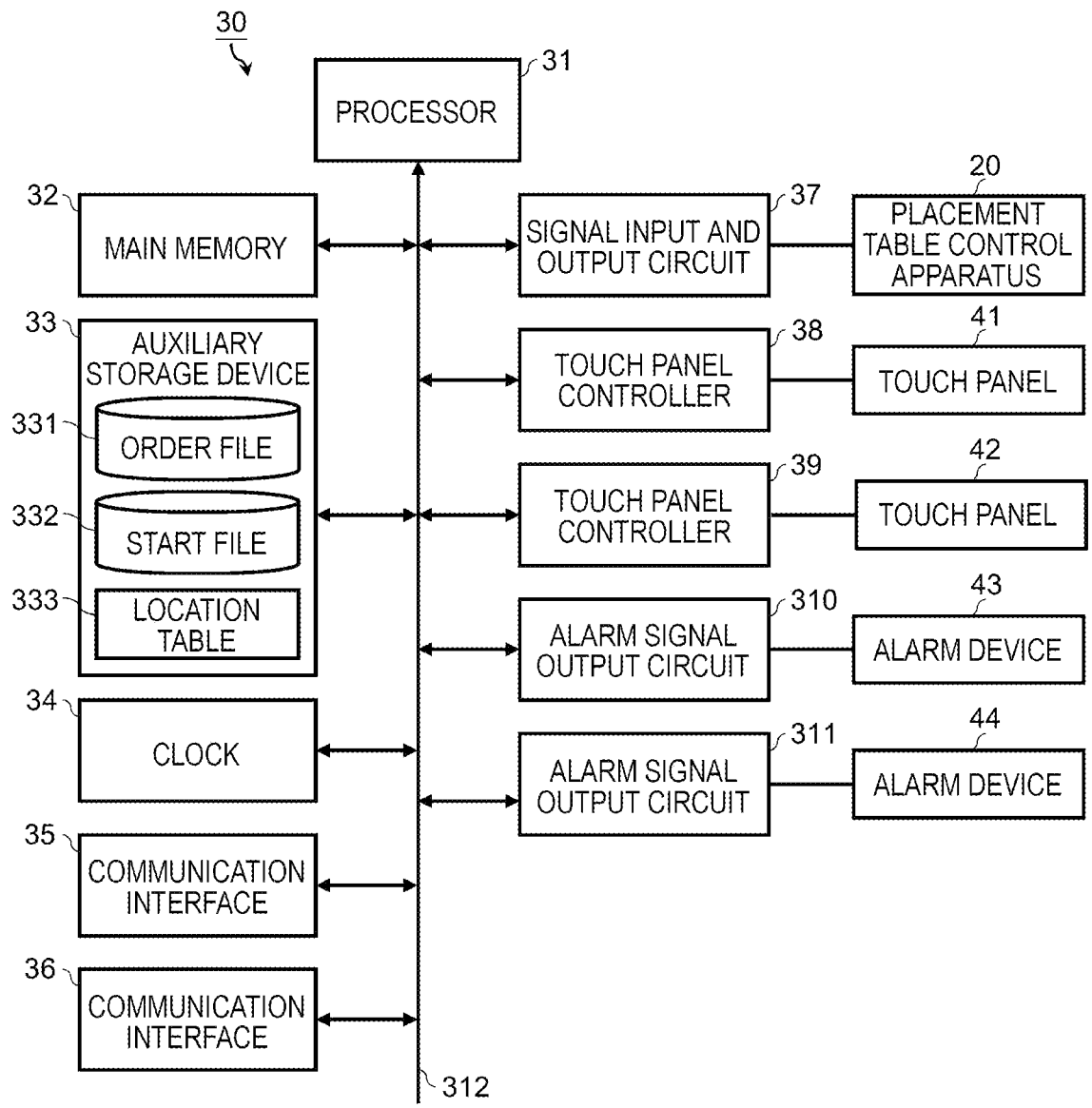
FIG. 4 is a block diagram illustrating a main circuit configuration of an order management apparatus.

FIG. 4 is a block diagram illustrating a main circuit configuration of the order management apparatus 30. The order management apparatus 30 includes a processor 31, a main memory 32, an auxiliary storage device 33, a clock 34, two communication interfaces 35 and 36 (transceiver, transmitter, receiver), a signal input and output circuit 37, two touch panel controllers 38 and 39, and two alarm signal output circuits 310 and 311. The order management apparatus 30 connects the processor 31 to the main memory 32, the auxiliary storage device 33, the clock 34, the communication interfaces 35 and 36, the signal input and output circuits 37, the touch panel controllers 38 and 39, and the alarm signal output circuits 310 and 311 with a system bus 312. The system bus 312 includes an address bus, a data bus, or the like. The order management apparatus 30 forms a computer by connecting the processor 31 to the main memory 32 and the auxiliary storage device 33 with the system bus 312. The processor 31 corresponds to a central portion of the computer. The processor 31 controls each unit to realize various functions as the order management apparatus 30 according to an operating system or an application program. The processor 31 is, for example, a Central Processing Unit (CPU).

The main memory 32 corresponds to a main memory portion of the computer. The main memory 32 includes a non-volatile memory area and a volatile memory area. The main memory 32 stores the operating system or the application program in the non-volatile memory area. The main memory 32 stores data necessary for the processor 31 to execute a process for controlling each unit in the volatile memory area. The main memory 32 uses the volatile memory area as a work area where the data is appropriately rewritten by the processor 31. The non-volatile memory area is, for example, a Read Only Memory (ROM). The volatile memory area is, for example, a Random Access Memory (RAM).

The auxiliary storage device 33 corresponds to an auxiliary storage portion of the computer. As the auxiliary storage device 33, various storage devices such as an Electric Erasable Programmable Read-Only Memory (EEPROM), a Hard Disc Drive (HDD), or a Solid State Drive (SSD) or the like are used independently, or are used in combination of a plurality thereof. The auxiliary storage device 33 stores data to be used by the processor 31 to perform various processes, data generated by the process of the processor 31, or the like. The auxiliary storage device 33 may store the application program. The application program stored in the main memory 32 or the auxiliary storage device 33 includes a control program which will be described later. A method for installing the control program in the main memory 32 or the auxiliary storage device 33 is not particularly limited. The control program is recorded in a removable recording medium, or distributed by communication via a network, so that the control program can be installed in the main memory 32 or the auxiliary storage device 33. The recording medium may be in any form as long as the recording medium can store a program such as a compact disc (CD) ROM (CD-ROM), a memory card, or the like, and can be read by an apparatus.

The clock 34 functions as a time information source of the order management apparatus 30. The processor 31 acquires a current date and time based upon time information tracked by the clock 34.

One communication interface 35 is a circuit for performing data communication with another system device connected to the LAN 50 according to a predetermined communication protocol. The other communication interface 36 is a circuit for performing data communication with the user terminal 80 connected via the Internet 70 according to a predetermined communication protocol.

The signal input and output circuit 37 has a function of outputting a control signal to the placement table control apparatus 20 and a function of inputting an information signal outputted from the placement table control apparatus 20.

One touch panel controller 38 has a function of outputting an image signal to the touch panel 41 and a function of inputting a touch sensor signal. The other touch panel controller 39 has a function of outputting an image signal to the touch panel 42 and a function of inputting a touch sensor signal.

One alarm signal output circuit 310 has a function of outputting an alarm signal to the alarm device 43. The other alarm signal output circuit 311 has a function of outputting an alarm signal to the alarm device 44.

The order management apparatus 30 having the above-described configuration uses a part of the storage area of the auxiliary storage device 33 as an area of an order file 331, a start file 332, and a location table 333. The order file 331 is an area for storing an order record Ra (refer to FIG. 5) generated every time an order is received from the orderer. The start file 332 is an area for storing a start record Rb (refer to FIG. 6) generated for each order in which manufacturing of a commodity is started.

FIG. 5 is a schematic diagram illustrating a main data structure of the order record Ra. As illustrated in the diagram, the order record Ra includes an order number, a terminal communication parameter, a pick-up time, ordered commodity information, and an order status. The order number is a code for order identification that is issued every time an order is received. For example, the order number is a serial number that is automatically issued so that the order number is not duplicated within one business day. The order number may include a character such as an alphabetical character or the like in addition to a numerical value.

The terminal communication parameter is a parameter required for the data communication with the user terminal 80 used by the orderer. The terminal communication parameter includes, for example, an internet protocol (IP) address. The terminal communication parameter is acquired from the user terminal 80.

The pick-up time is a time when the orderer wishes to pick up the ordered commodity, and the ordered commodity information is information related to the ordered commodity. The ordered commodity information includes, for example, information such as a commodity name, a quantity, a size, presence or absence of a topping, or the like. If the orderer orders two or more items of commodities, the ordered commodity information includes information on each item. The order status represents a state of the order record Ra. The order record Ra includes an unstarted state and a started state. The unstarted state represents a state before the manufacturing of the ordered commodity is started. The started state represents a state after the manufacturing of the ordered commodity is started. In the embodiment, the order status in the unstarted state is set to "0," and the order status in the started state is set to "1."

FIG. 6 is a schematic diagram illustrating a main data structure of the start record Rb. As illustrated in the diagram, the start record Rb includes the order number, the terminal communication parameter, the pick-up time, the ordered commodity information, and start status. The order number, the terminal communication parameter, the pick-up time, and the ordered commodity information are as described above. The start status represents a state of the start record Rb. The start record Rb includes a starting state, a provision standby state, a providing state, and a pick-up state. The starting state represents a state in which the manufacturing of the ordered commodity is being started. The provision standby state represents a state in which the commodity is completed and can be provided to the orderer, but is in a standby state because there is no vacancy in the placement locations [A] to [H] of the placement table 10. The providing state represents a state in which the commodity is being provided to the orderer by using the placement table 10. The pick-up state represents a state in which the orderer picks up the commodity placed on the placement table 10. In the embodiment, the start status in the starting state is set to "0," the start status in the provision standby state is set to "1," the start status in the providing state is set to "2," and the start status in the pick-up state is set to "3."

FIG. 7 is a block diagram of the location table 333. As illustrated in the diagram, the location table 333 includes a field Fa of the placement locations [A] to [H], a field Fb of an empty flag, and a field Fc of an order number. The field Fa describes the placement locations [A] to [H] of the placement table 10. The field Fb describes 1-bit data for identifying whether the corresponding placement locations [A] to [H] are in an empty state in which the commodity is not placed thereon or in a used state in which the commodity is placed thereon. Hereinafter, the 1-bit data is referred to as the empty flag. In the embodiment, the empty flag indicating the empty state is set to "0," and the empty flag indicating the used state is set to "1." With respect to the placement locations [A] to [H] in the used state, the field Fc describes the order numbers of the commodities being placed on the placement locations [A] to [H].

FIGS. 8 to 12 are flowcharts illustrating a procedure of a main information process executed by the processor 31 of the order management apparatus 30 according to the control program. Hereinafter, a main operation of the commodity providing apparatus including the order management apparatus 30 will be described with reference to each diagram. An operation procedure described below is an example. The procedure can be appropriately changed as long as the same effect can be obtained.

Figure 8:
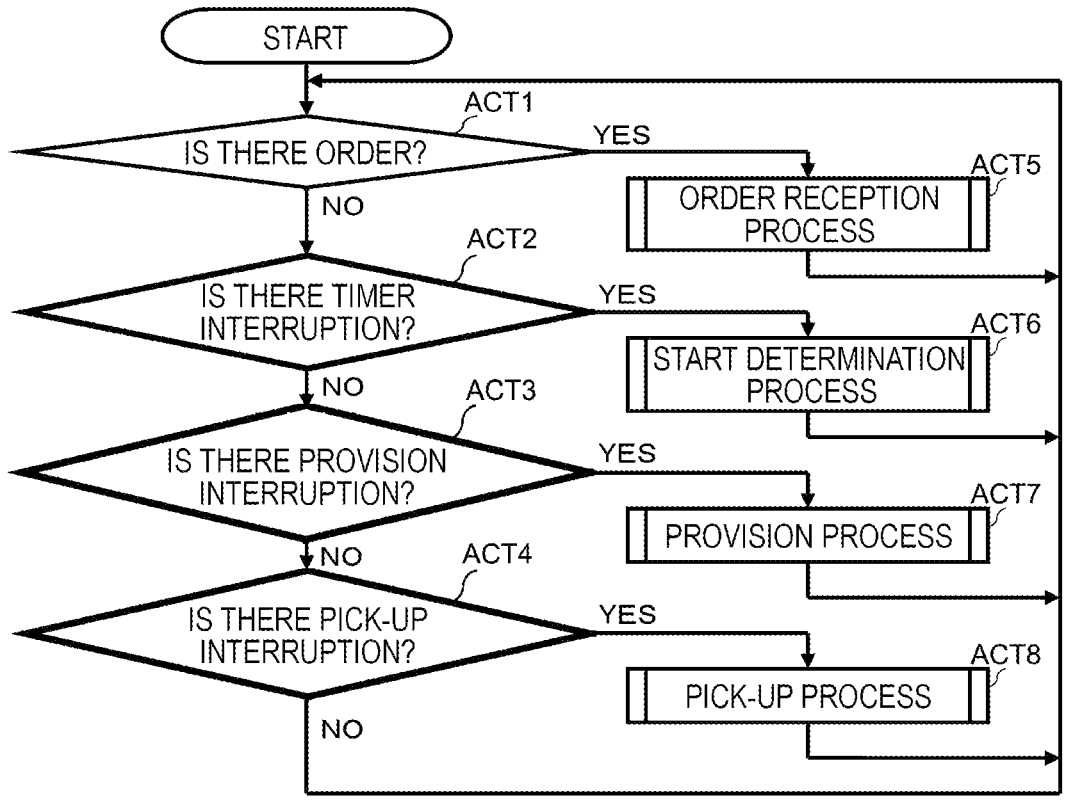
FIG. 8 is a flowchart illustrating a procedure of a main information process executed by a processor of the order management apparatus.

As illustrated in FIG. 8, the processor 31 determines whether or not there is an order, such as an online order, as ACT1. If there is no order, the processor 31 determines NO in ACT1 and proceeds to ACT2. The processor 31 determines presence or absence of a timer interruption as ACT2. If there is no timer interruption, the processor 31 determines NO in ACT2 and proceeds to ACT3. The processor 31 determines presence or absence of a provision interruption as ACT3. If there is no provision interruption, the processor 31 determines NO in ACT3 and proceeds to ACT4. The processor 31 determines presence or absence of a pick-up interruption as ACT4. If there is no pick-up interruption, the processor 31 determines NO in ACT4 and returns to ACT1. Here, the processor 31 waits for the order, the timer interruption, the provision interruption, or the pick-up interruption in ACT1 to ACT4.

For example, an orderer who orders a commodity online installs an application program for the order in the user terminal 80 and performs user registration. Next, the orderer registers information necessary for online settlement such as credit card settlement, electronic money settlement, and code settlement, or the like. After completing the above-described operation, the orderer selects a commodity to be ordered from a menu screen displayed on the user terminal 80 and specifies a pick-up time. Next, if the order is completed, the orderer operates the user terminal 80 to instruct the online settlement. By doing so, the order and settlement are performed between the user terminal 80 and the order management apparatus 30. The user registration and the registration of online settlement information are omitted when using the order for the second and subsequent times.

If the order is received from the user terminal 80 connected via the Internet 70 in a standby state of ACT1 to ACT4, the processor 31 determines YES in ACT1 and proceeds to ACT5. The processor 31 executes an order reception process as ACT5.

Figure 9:
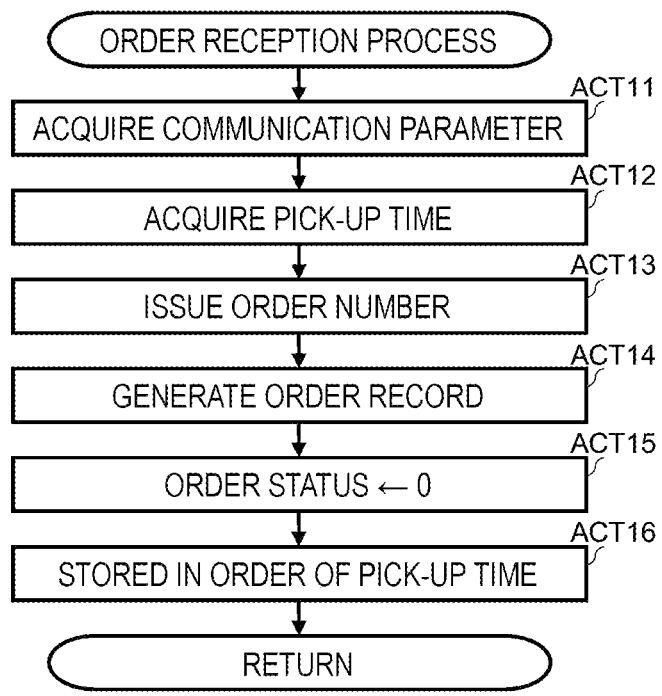
FIG. 9 is a flowchart specifically illustrating a procedure of an order reception process illustrated in FIG. 8.

FIG. 9 is a flowchart specifically illustrating a procedure of the order reception process. When entering the order reception process, the processor 31 acquires a communication parameter such as an IP address or the like from the user terminal 80 as ACT11. The processor 31 also acquires the pick-up time specified by the user terminal 80 as ACT12.

The processor 31 issues an order number as ACT13. The order number is transmitted to the user terminal 80 via the Internet 70. Accordingly, the order number is displayed on a display device of the user terminal 80.

As ACT14, the processor 31 generates the order record Ra based upon the information obtained in the processes of ACT11 to ACT13. Next, the processor 31 sets the order status to "0" as ACT15. The processor 31 stores the order record Ra in the order file 331 in the order of the earliest pick-up time in the order record Ra as ACT16. If the above-described process is completed, the processor 31 exits from the order reception process and becomes the standby state of ACT1 to ACT4.

The description refers back to FIG. 8.

Every time the clock 34 tracks (accrues), for example, one minute, a timer interruption signal is inputted to the processor 31. If the timer interruption signal is inputted in the standby state of ACT1 to ACT4, the processor 31 determines YES in ACT2 and proceeds to ACT6. The processor 31 executes a start determination process as ACT6.

Figure 10:
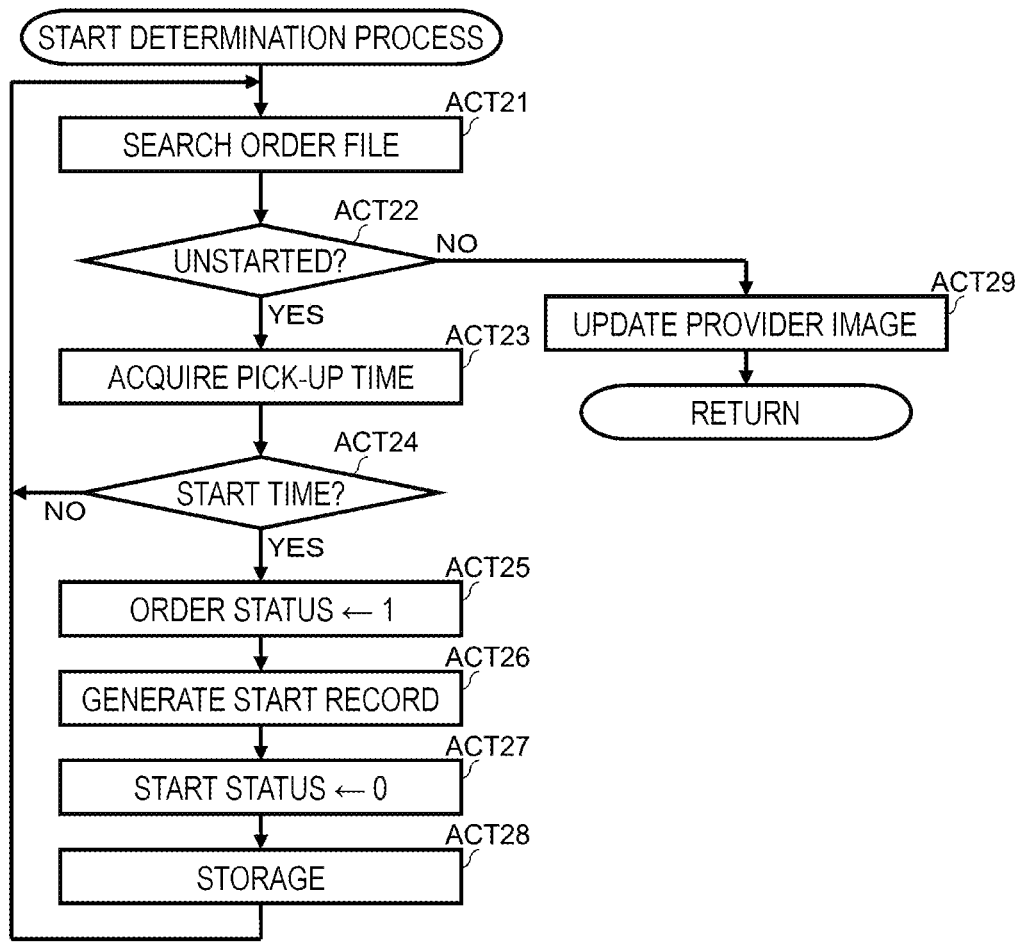
FIG. 10 is a flowchart specifically illustrating a procedure of a start determination process illustrated in FIG. 8.

FIG. 10 is a flowchart specifically illustrating a procedure of the start determination process. When entering the start determination process, the processor 31 searches the order file 331 as ACT21. Next, the processor 31 searches the order record Ra of which order status is "0," that is, in the unstarted state as ACT22. Hereinafter, the order record Ra in the unstarted state will be referred to as a target order record Ra.

When detecting the target order record Ra, the processor 31 determines YES in ACT22 and proceeds to ACT23. The processor 31 acquires the pick-up time from the target order record Ra as ACT23. Next, the processor 31 confirms whether or not the time of the clock 34 is start time. The start time is derived from the pick-up time. The start time is time which is predetermined time earlier than the pick-up time. The predetermined time is uniformly set according to standard manufacturing time of the commodity. As the predetermined time, different time may be set on a per commodity item basis. The predetermined time may vary depending on the number of commodities or the number of items provided in the ordered commodity information. If the current time does not reach the start time, the processor 31 determines NO in ACT24 and returns to ACT21. If the current time reaches the start time, the processor 31 determines YES in ACT24 and proceeds to ACT25. The processor 31 sets the order status of the target order record Ra to "1" as ACT25.

The processor 31 generates the start record Rb by using the order number, the terminal communication parameter, the pick-up time, and the ordered commodity information of the target order record Ra as ACT26. Next, the processor 31 sets the start status of the start record Rb to "0" as ACT27. The processor 31 stores the start record Rb in the start file 332 as ACT28. After that, the processor 31 returns to ACT21.

The processor 31 returning to ACT21 continues to search the order file 331. Next, every time the processor 31 detects the target order record Ra, the processor 31 repeatedly executes the process after ACT23. Therefore, in the timer interruption process, the start record Rb is generated based upon the target order record Ra reaching the start time derived from the pick-up time among the target order records Ra, and is stored in the start file 332.

In this manner, if the process after ACT23 is executed for all the target order records Ra stored in the order file 331, the processor 31 determines NO in ACT22 and proceeds to ACT29. The processor 31 updates a provider image SCa (refer to FIG. 13) displayed on the touch panel 41 as ACT29.

FIG. 13 is an example of the provider image SCa. The provider image SCa displays a list of the order number, the pick-up time, and the commodity name of the start record Rb of which start status is "0," that is, in the starting state. The commodity name is displayed for each item if a plurality of items are included as the ordered commodity information. If two or more commodities of the same item are included as the ordered commodity information, the number of the commodity names thereof is added in parentheses. The provider image SCa displays a provision button BTa in association with each order number. The provision button BTa is a touch button reproduced on a screen of the touch panel 41 by software. If a commodity whose order is received by the order specified by the order number is completed, the provider touches the provision button BTa corresponding to the order number. If the provision button BTa is touched, a provision interruption signal is inputted to the processor 31 from the touch panel 41. The provision interruption signal includes touch position information indicating a position on the touched image. The description refers back to FIG. 8.

If the provision interruption signal is inputted in the standby state of ACT1 to ACT4, the processor 31 determines YES in ACT3 and proceeds to ACT7. The processor 31 executes a provision process as ACT7.

Figure 11:
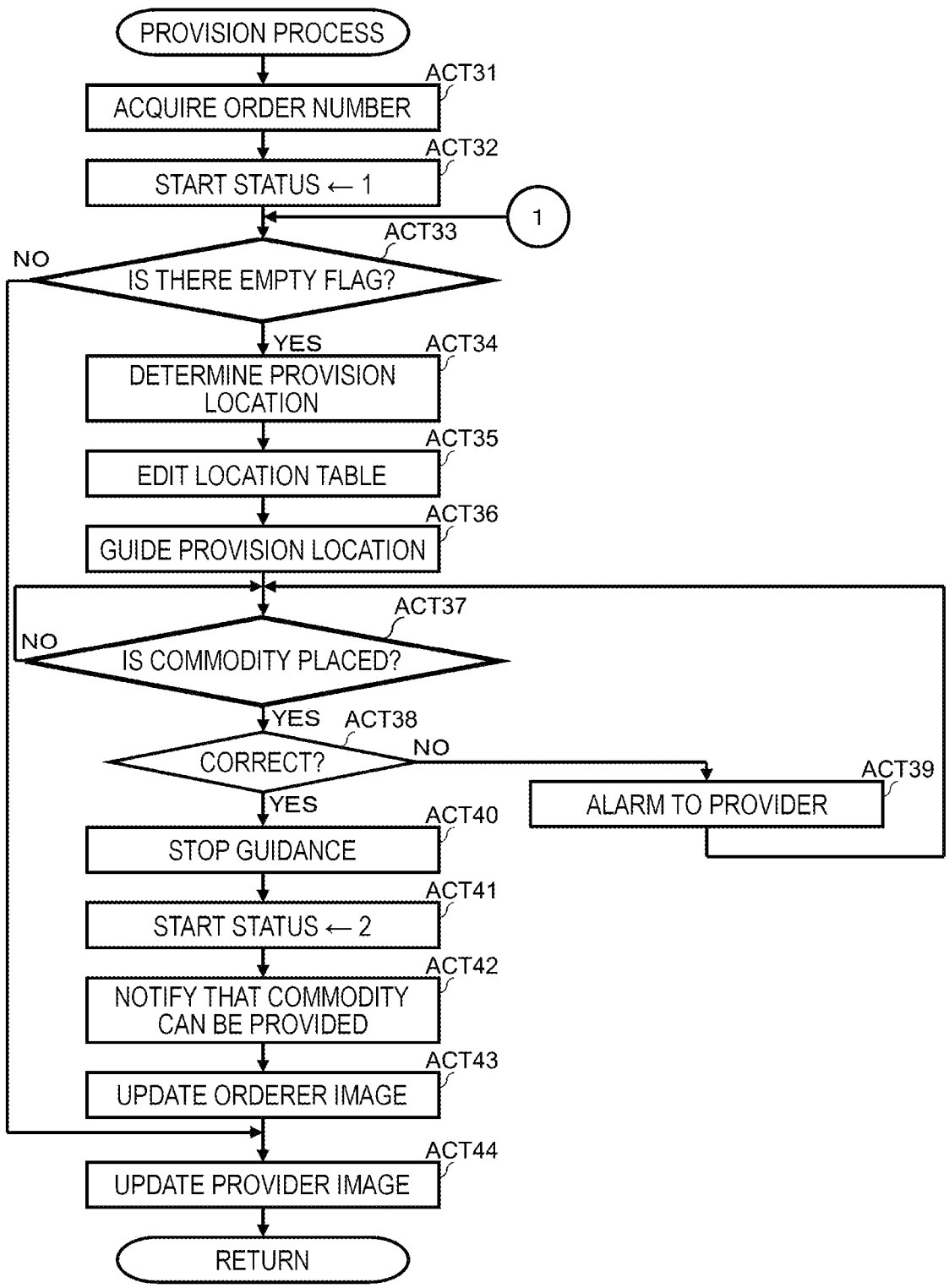
FIG. 11 is a flowchart specifically illustrating a procedure of a provision process illustrated in FIG. 8.

FIG. 11 is a flowchart specifically illustrating a procedure of the provision process. When entering the provision process, the processor 31 specifies the order number displayed on the provider image SCa corresponding to the touched provision button BTa from the data of the provider image SCa and the touch position information as ACT31. Next, the processor 31 sets the start status of the start record Rb including the specified order number to "1" as ACT32. Hereinafter, the start record Rb including the specified order number will be referred to as a target start record Rb.

The processor 31 refers to the location table 333 and confirms whether or not there are placement locations [A] to [H] of which empty flag is "0" as ACT33. If there is one or more placement locations [A] to [H] of which empty flag is "0," the processor 31 determines YES in ACT33 and proceeds to ACT34. The processor 31 determines one of the placement locations [A] to [H] of which empty flag is "0" as a provision location as ACT34. A selection algorithm is freely selected if there are two or more placement locations of which empty flag is "0." For example, the processor 31 searches the location table 333 in order from the placement location [A], and when detecting the placement location (for example, [C]) of which empty flag is "0," the processor 31 sets the next placement location (for example, [D]) as a search start position of the next provision process. Next, if the search is performed up to the placement location [H], the search is continuously performed by returning to the placement location [A]. By doing so, the provision location is not biased to one location.

Hereinafter, a case in which the placement location [C] is determined as the provision location will be described.

The processor 31 determining the placement location [C] as the provision location edits the location table 333 as ACT35.

Specifically, the processor 31 rewrites the empty flag of the placement location [C] from "0" to "1." The order number of the target start record Rb is described in the field Fc of the placement location [C].

The processor 31 guides the provider to the provision location as ACT36. Specifically, the processor 31 allows the signal input and output circuit 37 to output a control signal with respect to the guide lamp 113 at the placement location [C]. As a result, the control signal with respect to the guide lamp 113 is outputted from the signal input and output circuit 37 to the placement table control apparatus 20. As a result, the guide lamp 113 lights up or blinks under the control of the placement table control apparatus 20. Therefore, the provider touching the provision button BTa may place the completed commodity on the placement location [C] where the guide lamp 113 lights up or blinks.

Here, the processor 31 forms a provision guidance unit by executing the processes of ACT34 to ACT36 in cooperation with the placement table control apparatus 20 and the guide lamps 111 to 118. That is, the processor 31 guides the provider of the commodity to the placement locations [A] to [H] in the placement table 10 of the commodity that can be provided.

The processor 31 waits for the commodity to be placed on the placement location [C] as ACT37. That is, the processor 31 waits for an information signal indicating that a measurement value of the weight sensor 123 provided at the placement location [C] increases due to the placement of the commodity. If the signal input and output circuit 37 receives the information signal outputted from the placement table control apparatus 20, the processor 31 determines YES in ACT37 and proceeds to ACT38. The processor 31 confirms whether or not the information signal is the information signal indicating that the measurement value of the weight sensor 123 provided at the placement location [C] increases due to the placement of the commodity as ACT38.

Here, if the information signal is an information signal indicating that the measurement value of the weight sensor 123 provided at other placement locations [A] and [B] or [D] to [H] increases due to the placement of the commodity, the processor 31 determines NO in ACT38 and proceeds to ACT39. The processor 31 controls an output of the alarm signal to the alarm device 43 as ACT39. By the above-described control, the alarm signal is outputted from the alarm signal output circuit 310, and the alarm is issued from the alarm device 43. Therefore, the provider notices that the commodity is placed on a wrong location. The alarm from the alarm device 43 is stopped after predetermined time elapses. The processor 31 that controls the output of the alarm signal returns to ACT37.

Here, the processor 31 forms a provision monitoring unit by executing the processes of ACT37 and ACT38 in cooperation with the weight sensors 121 to 128 and the placement table control apparatus 20. That is, the processor 31 monitors a situation in which the commodity is placed on the placement locations [A] to [H] of the placement table 10.

The processor 31 forms a provision alarm unit by executing the process of ACT39 in cooperation with the alarm device 43. That is, if the provision monitoring unit detects that the commodity is placed on a location other than the placement location guided by the provision guidance unit, the processor 31 issues the alarm from the alarm device 43.

If the information signal outputted from the placement table control apparatus 20 is the information signal indicating that the measurement value of the weight sensor 123 provided at the placement location [C] increases due to the placement of the commodity, the processor 31 determines YES in ACT38, and proceeds to ACT40. The processor 31 stops the guidance of the provision location as ACT40. Specifically, the processor 31 stops the output of the control signal with respect to the guide lamp 113 provided at the placement location [C]. As a result, the guide lamp 113 is turned off by the control of the placement table control apparatus 20.

The processor 31 sets the start status of the target start record Rb to "2" as ACT41. The processor 31 notifies the orderer that the commodity can be provided as ACT42. Specifically, the processor 31 performs the data communication with the user terminal 80 connected to the Internet 70 by using the terminal notification parameter of the target start record Rb. Next, the processor 31 outputs a signal notifying the user terminal 80 that the commodity can be provided. A message indicating that the commodity can be provided is displayed on the user terminal 80 receiving this signal together with the order number.

Here, the processor 31 forms a pick-up notification unit by executing the process of ACT42. That is, if the provision monitoring unit detects that the commodity is placed on the placement location guided by the provision guidance unit, the processor 31 notifies the orderer of the commodity to come and pick up the commodity.

The processor 31 updates an orderer image SCb (refer to FIG. 14) displayed on the touch panel 42 as ACT43. The orderer image SCb will be described later. The processor 31 proceeds to ACT44.

On the other hand, in ACT33, if there are no placement locations [A] to [H] of which empty flag is "0," the processor 31 determines NO and proceeds to ACT44. The processor 31 updates the provider image SCa displayed on the touch panel 41 as ACT44. As described above, if the provision button BTa is touched, the start status of the start record Rb including the order number corresponding to the provision button BTa becomes "1" or "2." Therefore, by the process of ACT44, the touched provision button BTa, and the information of the order number, the pick-up time, and the commodity name corresponding to the provision button BTa are deleted from the provider image SCa. If the process of ACT44 is completed, the processor 31 returns to the standby state of ACT1 to ACT4 of FIG. 8.

FIG. 14 is an example of the orderer image SCb. The orderer image SCb displays a list of the order number, the pick-up time, and the commodity name of the start record Rb of which start status is "2," that is, in the providing state. The commodity name is displayed for each item if a plurality of items are included as the ordered commodity information. If two or more commodities of the same item are included as the ordered commodity information, the number of the commodity names thereof is added in parentheses. The orderer image SCb displays a pick-up button BTb in association with each order number. The pick-up button BTb is a touch button reproduced on the screen of the touch panel 41 by software.

The orderer who knows that the commodity ordered by himself or herself is completed by the notification to the user terminal 80 or by the information of the orderer image SCb displayed on the touch panel 42 touches the pick-up button BTb displayed corresponding to the order number issued at the time of ordering. If the pick-up button BTb is touched, a pick-up interruption signal is inputted to the processor 31 from the touch panel 42. The pick-up interruption signal includes touch position information indicating a position on the touched image.

If the pick-up interruption signal is inputted thereto in the standby state of ACT1 to ACT4, the processor 31 determines YES in ACT4 and proceeds to ACT8. The processor 31 executes a pick-up process as ACT8.

Figure 12:
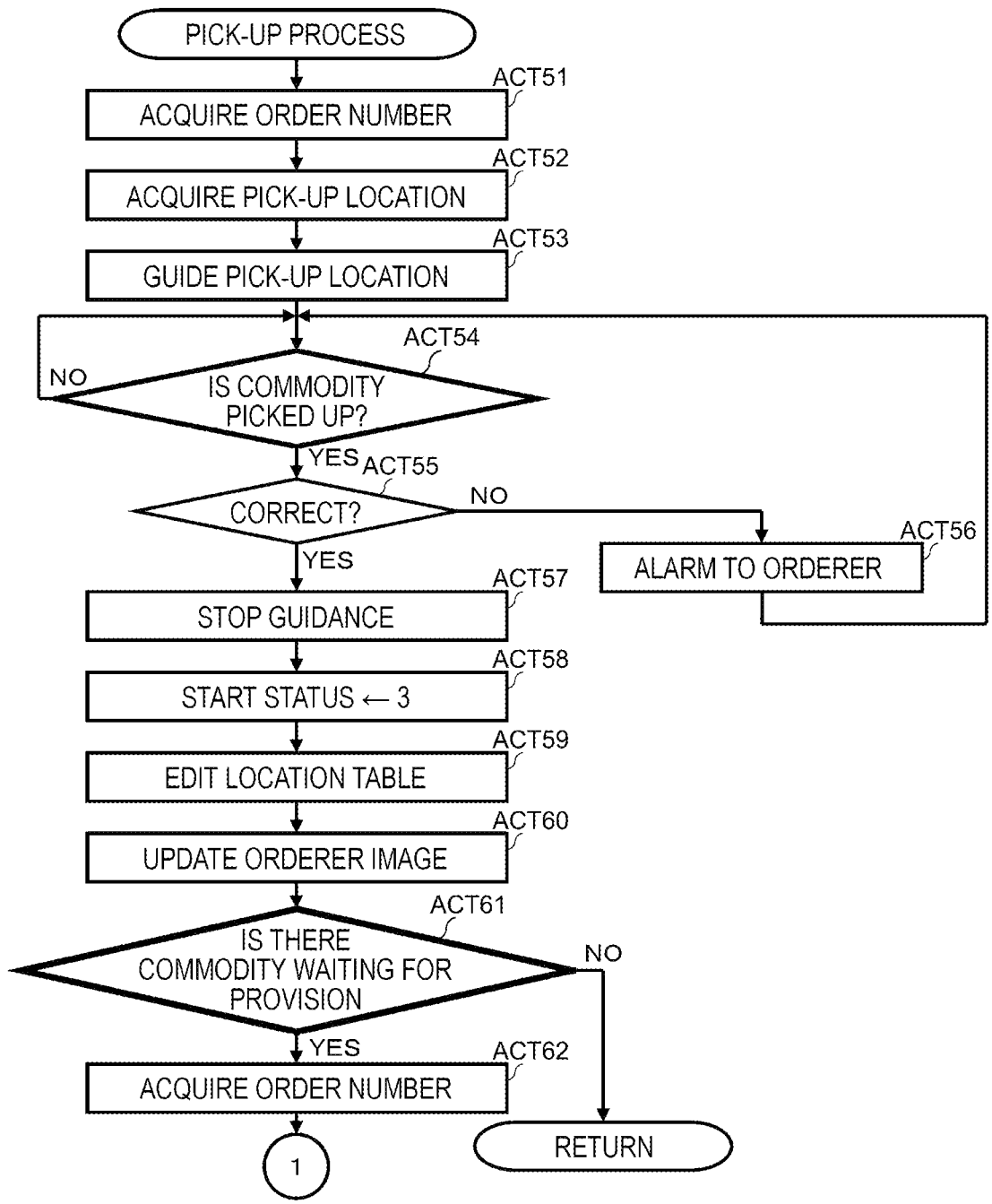
FIG. 12 is a flowchart specifically illustrating a procedure of a pick-up process illustrated in FIG. 8.

FIG. 12 is a flowchart specifically illustrating a procedure of the pick-up process. When entering the pick-up process, the processor 31 specifies the order number displayed on the orderer image SCb corresponding to the touched pick-up button BTb from the data of the orderer image SCb and the touch position information as ACT51. Next, the processor 31 searches the location table 333 as ACT52, and acquires a placement location where the specified order number is described in the field Fc as a pick-up location. Hereinafter, a case in which the placement location [C] is obtained as the pick-up location will be described.

The processor 31 guides the orderer to the pick-up location as ACT53. Specifically, the processor 31 allows the signal input and output circuit 37 to output a control signal with respect to the guide lamp 113 at the placement location [C]. Accordingly, the control signal with respect to the guide lamp 113 is outputted from the signal input and output circuit 37 to the placement table control apparatus 20. As a result, the guide lamp 113 lights up or blinks under the control of the placement table control apparatus 20. Therefore, the orderer touching the pick-up button BTb may pick up the commodity placed on the placement location [C] where the guide lamp 113 lights up or blinks.

Here, the processor 31 forms a pick-up guidance unit by executing the processes of ACT51 to ACT53 in cooperation with the placement table control apparatus 20 and the guide lamps 111 to 118. That is, the processor 31 guides the orderer of the commodity placed on the placement table 10 to the placement locations [A] to [H] of the commodity.

The processor 31 waits for the commodity to be picked up from the placement location [C] as ACT54. That is, the processor 31 waits for an information signal indicating that the measurement value of the weight sensor 123 provided at the placement location [C] decreases due to the pick-up of the commodity. If the signal input and output circuit 37 receives the information signal outputted from the placement table control apparatus 20, the processor 31 determines YES in ACT54 and proceeds to ACT55. The processor 31 confirms whether or not the information signal is the information signal indicating that the measurement value of the weight sensor 123 provided at the placement location [C] decreases due to the pick-up of the commodity as ACT55.

Here, if the information signal is an information signal indicating that the measurement value of the weight sensor 123 provided at other placement locations [A] and [B] or [D] to [H] decreases due to the pick-up of the commodity, the processor 31 determines NO in ACT55 and proceeds to ACT56. The processor 31 controls an output of the alarm signal to the alarm device 44 as ACT56. By the above-described control, the alarm signal is outputted from the alarm signal output circuit 311 and the alarm is issued from the alarm device 44. Therefore, the orderer notices that he or she picks up the commodity on the wrong pick-up location. The alarm from the alarm device 44 is stopped after predetermined time elapses. The processor 31 controlling the output of the alarm signal returns to ACT54.

Here, the processor 31 forms a pick-up monitoring unit by executing the processes of ACT54 and ACT55 in cooperation with the weight sensors 121 to 128 and the placement table control apparatus 20. That is, the processor 31 monitors a situation in which the commodity is picked up from the placement locations [A] to [H] of the placement table 10.

The processor 31 forms a pick-up alarm unit by executing the process of ACT56 in cooperation with the alarm device 43. That is, if the pick-up monitoring unit detects that the commodity is picked up from a location other than the placement location guided by the pick-up guidance unit, the processor 31 issues the alarm from the alarm device 44.

If the information signal outputted from the placement table control apparatus 20 is the information signal indicating that the measurement value of the weight sensor 123 provided at the placement location [C] decreases due to the pick-up of the commodity, the processor 31 determines YES in ACT55 and proceeds to ACT57. The processor 31 stops the guidance of the pick-up location as ACT57. Specifically, the processor 31 stops the control signal with respect to the guide lamp 113 provided at the placement location [C]. As a result, the guide lamp 113 is turned off by the control of the placement table control apparatus 20.

The processor 31 sets the start status of the target start record Rb to "3" as ACT58. The processor 31 also edits the location table 333 as ACT59. Specifically, the processor 31 rewrites the empty flag of the placement location [C] from "1" to "0." The order number described in the field Fc of the placement location [C] is deleted. The processor 31 updates the orderer image SCb displayed on the touch panel 42 as ACT60. As described above, if the pick-up button BTb is touched, the start status of the start record Rb including the order number corresponding to the pick-up button BTb becomes "3." Therefore, the touched pick-up button BTb and the information of the order number, the pick-up time, and the commodity name corresponding to the pick-up button BTb are deleted from the orderer image SCb. The processor 31 confirms whether or not there is a commodity waiting to be provided as ACT61. That is, the processor 31 determines presence or absence of the start record Rb of which start status is "1." If there is no start record Rb of which start status is "1" in the start file 332, there is no commodity waiting to be provided. In this case, the processor 31 determines NO in ACT61 and exits from the pick-up process. The processor 31 returns to the standby state of ACT1 to ACT4 of FIG. 8.

If there is the start record Rb of which start status is "1" in the start file 332, there is the commodity waiting to be provided. The processor 31 determines YES in ACT61, and proceeds to ACT62. The processor 31 acquires the order number of the start record Rb of which start status is "1" as ACT62. Here, if there are two or more start records Rb of which start status is "1," the processor 31 acquires the order number of the start record Rb which is stored the earliest in the start file 332.

After that, the processor 31 proceeds to ACT33 in FIG. 11. In this case, since the orderer picks up the commodity placed on the placement location [C] guided as the pick-up location in the process of ACT53, the empty flag corresponding to the placement location [C] becomes [0]. Therefore, the processor 31 determines YES in ACT33, and determines the placement location [C] as the provision location in ACT34. After that, the processor 31 executes the process after ACT35 in the same manner as described above.

As described in detail above, the provider confirms the provider image SCa of the touch panel 42, and touches the provision button BTa corresponding to the order number of the commodity that can be provided. Next, one of the placement locations [A] to [H] in the placement table 10 is guided by the guide lamps 111 to 118. Therefore, since the provider is only required to place the commodity on the guided placement locations [A] to [H], the provider does not hesitate about where to place the commodity, so that work efficiency is improved.

If the provider touches the provision button BTa corresponding to the order number of the commodity that can be provided, the user terminal 80 of the orderer receiving the order with the order number is notified that the ordered commodity can be provided. The order number is displayed on the orderer image SCb of the touch panel 42. When confirming that the commodity can be provided, the provider touches the provision button BTa corresponding to the order number of the commodity. Next, one of the placement locations [A] to [H] in the placement table 10 is guided by the guide lamps 111 to 118. The guided placement locations [A] to [H] are locations where the commodity ordered by the orderer is placed by the provider. Therefore, since the orderer is only required to pick up the commodity from the guided placement locations [A] to [H], the orderer does not hesitate about which commodity to pick up, and does not mistakenly pick up a commodity ordered by another orderer.

Meanwhile, if the provider places the commodity on a location other than the placement location guided by the guide lamps 111 to 118, the alarm device 43 issues the alarm. Therefore, the provider can place the commodity on a correct placement location.

If the orderer picks up the commodity from the location other than the placement location guided by the guide lamps 111 to 118, the alarm is issued from the alarm device 44. Therefore, the orderer can pick up the commodity from the correct placement location.

While the embodiment of the commodity providing apparatus has been described above, the embodiment is not limited thereto.

Figure 15:
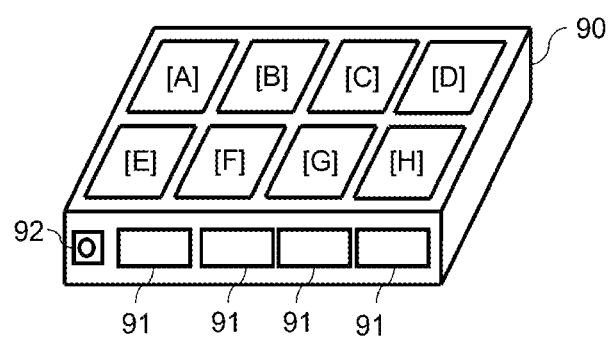
FIG. 15 is a diagram illustrating another embodiment of the placement table.
Figure 16:
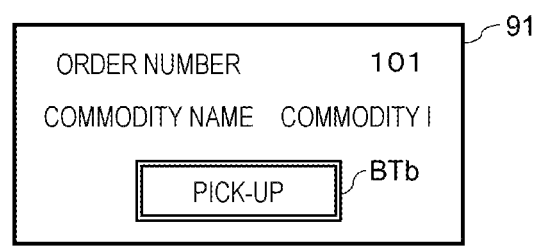
FIG. 16 is a diagram illustrating an example of an image displayed in another embodiment.

FIG. 15 is another embodiment of a placement table 90. A plurality of touch panels 91 (displays) are arranged on one end surface of the placement table 90. A camera 92 is arranged on the same end surface thereof. As illustrated in FIG. 16, the touch panel 91 can display the order number, the commodity name, and the pick-up button BTb as an image for each orderer.

In the above-described embodiment, the orderer image SCb is displayed on the touch panel 42. In another embodiment, an image is displayed on any one of the touch panels 91 for each orderer ordering the commodity that can be provided. An orderer receiving a notification indicating that the ordered commodity can be provided touches the pick-up button BTb of the image on which his or her own order number is displayed. Next, the guide lamps 111 to 118 of the placement locations [A] to [H] on which the ordered commodity is placed light up or blink, so that the orderer can correctly pick up the ordered commodity. Meanwhile, by using the above-described placement table 90, the touch panel 42 becomes unnecessary.

On the other hand, the camera 92 captures an image of the face of the orderer coming to pick up the commodity. The order management apparatus 30 can specify a gender, an age, or the like of the orderer by analyzing the face image of the orderer. Such information of the orderer can be used for marketing. Since the camera 92 is provided, a fraudulent behavior can be prevented.

In FIG. 15, a touch panel for a provider image may be arranged on an end surface of the side opposite to the end surface on which the touch panel 91 is arranged. By doing so, the touch panel 41 also becomes unnecessary.

The alarm devices 43 and 44 may be arranged to be integrated with the placement table 90.

While the above-described embodiment describes the case in which the placement locations [A] to [H] of the placement tables 10 and 90 are divided into eight, the number of placement locations is not limited to eight. The placement tables 10 and 90 may include two or more placement locations.

While the above-described embodiment describes the case in which an order is received by an order using the user terminal 80, the order is not necessarily required to be received online. For example, an order may be received by a so-called face-to-face order in which a salesclerk inputs data related to an order received verbally from a customer coming to a store into a POS terminal. Alternatively, the order and the face-to-face order may be mixed.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A commodity providing apparatus comprising:
a placement table on which a plurality of commodities can be placed, the placement table comprising:
a first placement location for receiving a first commodity of the plurality of commodities; and
a second placement location for receiving the first commodity;
a panel configured to display an order number associated with the first commodity;
a light associated with the first placement location;
a first sensor configured to produce a first signal when the first commodity is received by the first placement location;
a second sensor configured to produce a second signal when the first commodity is received by the second placement location;
an alarm device; and
a processor configured to:
cause the light to be illuminated so as to guide a provider to the first placement location;
cause the light to be illuminated so as to guide an orderer to the first placement location;
cause the panel to display the order number after the first placement location receives the first commodity;
receive the first signal from the first sensor;
determine that the first commodity is received by the first placement location after receiving the first signal;
cause the light to be illuminated so as to guide the orderer to the first placement location after determining that the first commodity is received by the first placement location;

receive the second signal from the second sensor;
determine that the first commodity is received by the second placement location after receiving the second signal; and
cause the alarm device to issue an alarm after determining that the first commodity is received by the second placement location.

2. The commodity providing apparatus of claim 1, wherein:
the second placement location is configured to receive a second commodity of the plurality of commodities; and
the second sensor is configured to not produce the second signal when the second commodity is received by the second placement location.

3. The commodity providing apparatus of claim 1, wherein:
the second placement location is configured to receive a second commodity of the plurality of commodities;
the second sensor is configured to produce a third signal when the second commodity is received by the second placement location; and
the processor is configured to:
receive the third signal from the second sensor;
determine that the second commodity is received by the second placement location after receiving the third signal; and
cause the alarm device to issue the alarm after determining that the first commodity is received by the second placement location.

4. The commodity providing apparatus of claim 1, wherein:
the first placement location is configured to receive a second commodity of the plurality of commodities; and
the first sensor is configured to configured to produce the first signal when the second commodity is received by the first placement location.

5. The commodity providing apparatus of claim 1, wherein:
the second placement location is additionally for receiving a second commodity of the plurality of commodities;
the second sensor is configured to produce a third signal when the second commodity is removed from the second placement location; and
the processor is configured to:
receive the third signal from the second sensor;
determine that the second commodity is removed from the second placement location after the third signal is received; and
cause the alarm device to issue the alarm after determining that the second commodity is removed from the second placement location.

6. The commodity providing apparatus of claim 1, wherein:
the second placement location is additionally for receiving a second commodity of the plurality of commodities;
the second sensor is configured to produce a third signal when a third commodity of the plurality of commodities is received by the second placement location;
the processor is configured to:
receive the third signal from the second sensor;
determine that the third commodity is received by the second placement location after the third signal is received; and
cause the alarm device to issue the alarm after determining that the third commodity is received by the second placement location.

7. A method comprising:
providing an apparatus including a placement table configured to permit a plurality of commodities to be placed thereon, the placement table including a first placement location and a second placement location, a light associated with the first placement location, a processor, a panel configured to display an order number associated with a first commodity, a first sensor, a second sensor, and an alarm device;
receiving, by the first placement location, the first commodity;
causing, by the processor, the light to be illuminated before the first placement location receives the first commodity and so as to guide a provider to the first placement location;
causing, by the processor, the light to be illuminated after the first placement location receives the first commodity and so as to guide an orderer to the first placement location; and
causing, by the processor, the panel to display the order number after the first placement location receives the first commodity;
receiving, by the processor, a first signal from the first sensor when the first commodity is received by the first placement location; and
determining, by the processor, that the first commodity is received by the first placement location after receiving the first signal;
wherein the processor causes the light to be illuminated so as to guide the orderer to the first placement location after determining that the first commodity is received by the first placement location;
receiving, by the processor, a second signal from the second sensor when the first commodity is received by the second placement location;
determining, by the processor, that the first commodity is received by the second placement location after receiving the second signal; and
causing, by the processor, the alarm device to issue an alarm after determining that the first commodity is received by the second placement location.

8. A system comprising:
a first counter configured to support a first commodity;
a second counter configured to support a second commodity;
a first sensor coupled to the first counter, the first sensor configured to:
provide a first signal when the first commodity is supported on the first counter; and
provide a second signal when the second commodity is supported on the first counter;
a second sensor coupled to the second counter, the second sensor configured to:
provide a third signal when the second commodity is supported on the second counter; and
provide a fourth signal when the first commodity is supported on the second counter;
an alarm device; and
a processor configured to:
receive the first signal;
receive the second signal;
receive the third signal;
receive the fourth signal; and cause the alarm device to issue an alarm after receiving at least one of the second signal or the fourth signal.

9. The system of claim 8, further comprising a first light configured to be selectively illuminated;
   wherein the processor is configured to cause the first light to be illuminated after receiving the first signal.

10. The system of claim 9, further comprising a second light configured to be selectively illuminated;
    wherein the processor is configured to cause the second light to be illuminated after receiving the third signal.

11. The system of claim 9, wherein the first light is coupled to the first counter.

12. The system of claim 8, further comprising a first display;
    wherein the processor is configured to cause the first display to display an order number associated with the first commodity after receiving the first signal.

13. The system of claim 12, further comprising a second display;
    wherein the processor is configured to cause the second display to display a commodity name associated with the second commodity after receiving the third signal.

14. The system of claim 8, wherein at least one of the first sensor or the second sensor is a weight sensor.

15. The system of claim 8, further comprising a transceiver configured to transmit an order number to a mobile device, the order number associated with at least one of the first commodity or the second commodity.

16. The system of claim 8, further comprising a transceiver configured to receive an order number from a mobile device, the order number associated with at least one of the first commodity or the second commodity.

* * * * *